United States Patent
McCallum

(10) Patent No.: US 6,609,329 B2
(45) Date of Patent: Aug. 26, 2003

(54) INSECT TRAP AND FITTING

(76) Inventor: William Gordon McCallum, 21 Litchfield Street, Christchurch (NZ)

( * ) Notice: Subject to any disclaimer, the term of this patent is extended or adjusted under 35 U.S.C. 154(b) by 0 days.

(21) Appl. No.: 09/860,808

(22) Filed: May 21, 2001

(65) Prior Publication Data

US 2002/0011021 A1 Jan. 31, 2002

(30) Foreign Application Priority Data

May 19, 2000 (NZ) .................................................. 504635

(51) Int. Cl.$^7$ ................................................ A01M 1/10
(52) U.S. Cl. .......................................... 43/107; 43/122
(58) Field of Search ................................ 43/122, 132.1, 43/133, 134, 107, 131; D22/122

(56) References Cited

U.S. PATENT DOCUMENTS

| | | | | |
|---|---|---|---|---|
| 4,218,842 A | | 8/1980 | Anderson ...................... 43/122 |
| 4,400,903 A | * | 8/1983 | Seidenberger ............... 43/122 |
| 4,571,880 A | * | 2/1986 | Hayward ...................... 43/122 |
| 4,638,592 A | * | 1/1987 | Schneidmiller ................ 426/1 |
| 4,706,407 A | * | 11/1987 | Melton ......................... 43/107 |
| 4,706,410 A | * | 11/1987 | Briese ......................... 43/107 |
| 4,986,024 A | * | 1/1991 | Peek et al. .................... 43/107 |
| 5,081,788 A | * | 1/1992 | Dowd et al. ................... 43/107 |
| 5,133,150 A | * | 7/1992 | Briese .......................... 43/122 |
| 5,231,792 A | * | 8/1993 | Warner ......................... 43/122 |
| 5,392,558 A | * | 2/1995 | Blomquist .................... 43/107 |
| 5,490,349 A | * | 2/1996 | Muramatsu ................... 43/121 |
| 5,540,011 A | * | 7/1996 | Groom et al. ................. 43/107 |
| 5,557,880 A | * | 9/1996 | Schneidmiller .............. 43/107 |
| 5,682,706 A | * | 11/1997 | Altenburg .................... 43/107 |
| 5,992,087 A | * | 11/1999 | Chu et al. ..................... 43/122 |
| 6,301,827 B1 | * | 10/2001 | Lankster ...................... 43/107 |

FOREIGN PATENT DOCUMENTS

| | | |
|---|---|---|
| AU | 41933/93 | 1/1994 |
| DE | 298466 A5 | 2/1992 |

* cited by examiner

Primary Examiner—Charles T. Jordan
Assistant Examiner—Tara M Golba
(74) Attorney, Agent, or Firm—Jacobson Holman PLLC

(57) ABSTRACT

An insect trap fitting adapted to cover an opening in a receptacle containing insect attractant. The fitting includes a cover plate with a first aperture in it and a first skirt extending downwardly from the periphery of the first aperture. A screen with a second aperture in it is located at the lower edge of the first skirt. A blade extends from the second aperture to a position above the first aperture in the cover plate. The fitting may also include a second skirt extending downwardly from the periphery of the second aperture, the blade extending from the lower edge of the second skirt to above the level of the first aperture in the cover plate. A fly trap includes the fitting and a receptacle.

10 Claims, 4 Drawing Sheets

INSECT TRAP AND FITTING

FIELD OF THE INVENTION

The invention relates to insect traps, and to insect trap fittings that provide a closure, for a receptacle, that allows insects to enter the receptacle but not escape.

BACKGROUND TO THE INVENTION

The effect of flies, and other flying insects, in both the domestic and farming environments is well known. In the domestic environment flies and other flying insects are not only annoying but pose a significant health risk through the spread of germs and disease. In the farming environment it is well known for flying insects, in particular flies, to infest animals, particularly sheep and cattle. This causes pain and suffering to the infested animal and results in loss to the farmer.

Various methods are known to combat flies and flying insects including sprays, powders and traps. A problem with many of these known methods is that they require regular attention in order to maintain their effectiveness. Sprays and powders must be reapplied on a regular basis in order to be effective. Traps must be serviced on a regular basis in order to remove trapped insects and replenish bait stocks.

SUMMARY OF THE INVENTION

It is an object of the present invention to provide an insect trap fitting that overcomes or ameliorates some of the disadvantages with the prior art, or at least provides the public with a useful alternative.

According to a first aspect of the invention provides for an insect trap fitting adapted to cover an opening in a receptacle containing insect attractant, the fitting including:
  a cover plate with a first aperture in it,
  a first skirt extending downwardly from the periphery of the first aperture;
  a screen at the lower edge of the first skirt, the screen having a second aperture in it; and
  a blade extending from the second aperture to a position above the first aperture in the cover plate.

According to a second aspect the invention provides for an insect trap including:
  a receptacle with an opening in it; and
  a fitting disposed to cover the opening, the fitting including:
    a cover plate with a first aperture in it,
    a first skirt extending downwardly from the periphery of the first aperture;
    a screen at the lower edge of the first skirt, the screen having a second aperture in it; and
    a blade extending from the second aperture to a position above the first aperture in the cover plate.

Preferably, the cover plate is a closure for a receptacle.

Preferably, the fitting includes a second skirt extending downwardly from the periphery of the second aperture, the blade extending from the lower edge of the second skirt to above the level of the first aperture in the cover plate.

Preferably, the cover plate is transparent, more preferably the entire fitting is made from transparent material.

Preferably, the blade is adapted so that air movement across the top surface of the cover plate results in a low pressure area and movement of air through the first aperture.

Preferably, the cover plate is adapted to cover the receptacle in such a manner that rainwater is allowed to pass into the receptacle thereby replenishing liquid covering the attractant.

Preferably, the screen is sized to allow air to pass through it, but not insects.

Preferably, the insect trap fitting is made from a plastic material. More preferable the insect trap fitting is made in one piece by an injection moulding or similar process.

In one particular embodiment the receptacle is a bag, the fitting being suspended and the open end or neck of the bag being secured to the periphery of the cover plate.

Further aspects of the invention will become apparent from the following description which is given by way of example only.

BRIEF DESCRIPTION OF THE DRAWINGS

The invention will now be described by way of example and with reference to the accompanying drawings in which.

DESCRIPTION OF THE PREFERRED EXAMPLE

Figure 1:
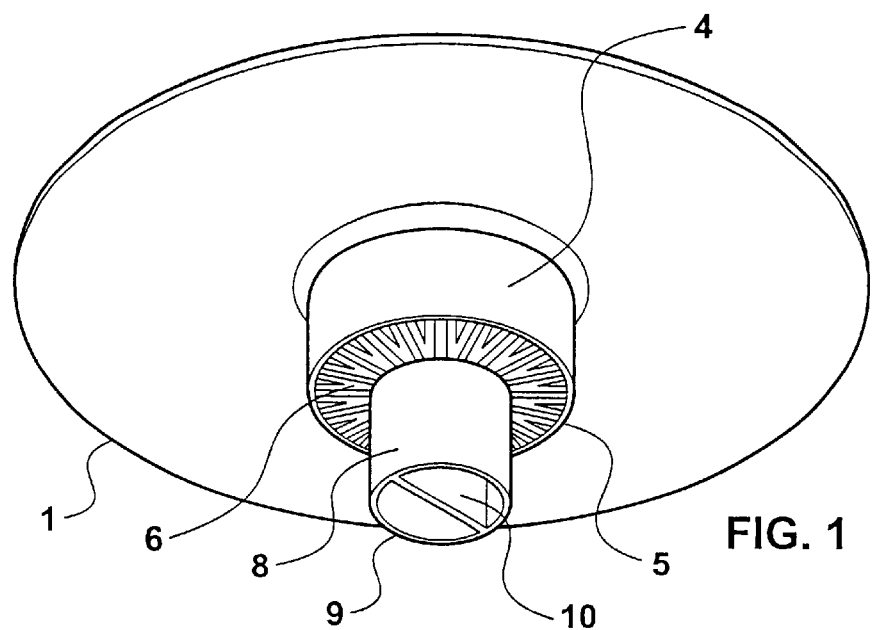
FIG. 1: illustrates a perspective view from below an insect trap fitting according to the invention.
Figure 2:
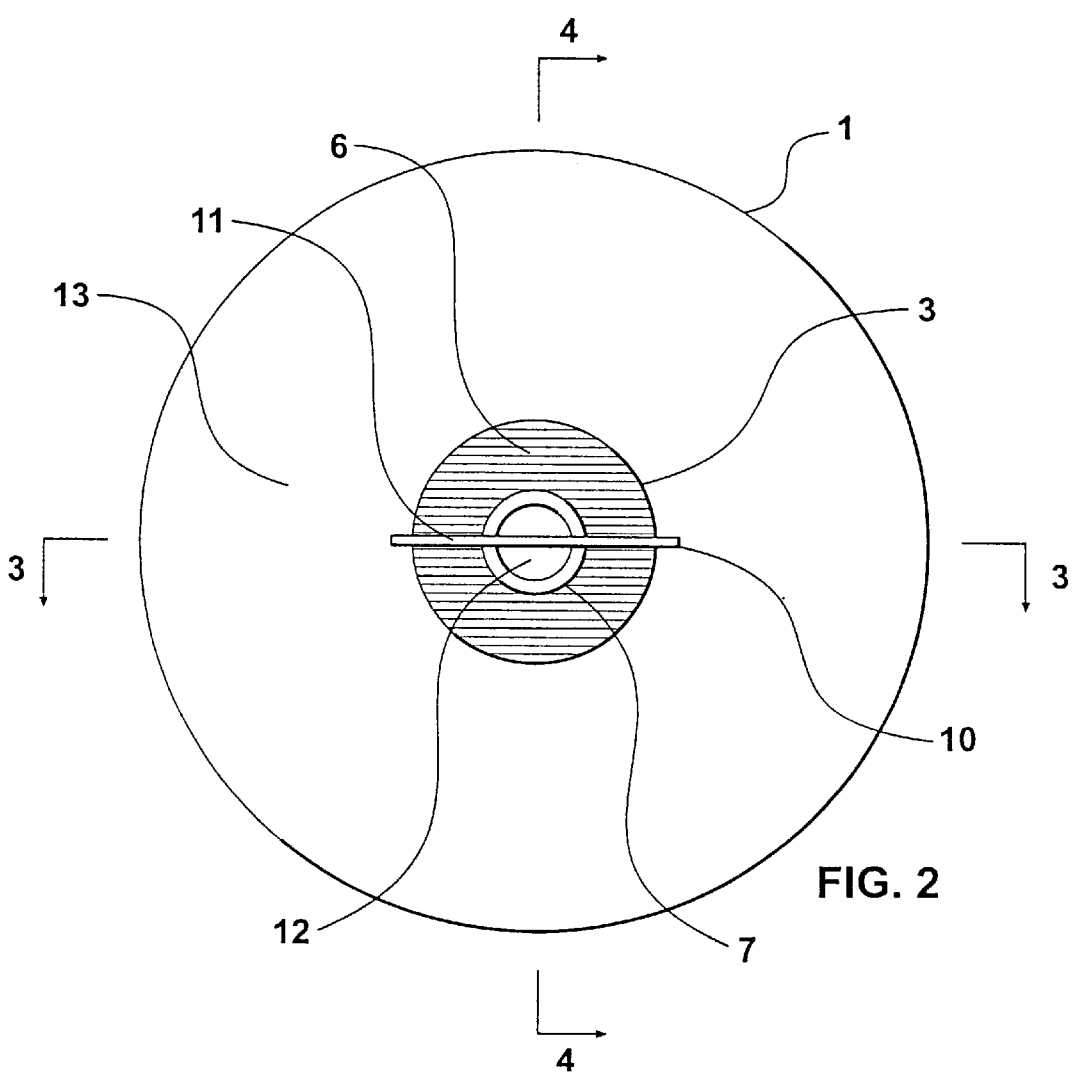
FIG. 2: illustrates a plan view of the insect trap fitting.
Figure 3:
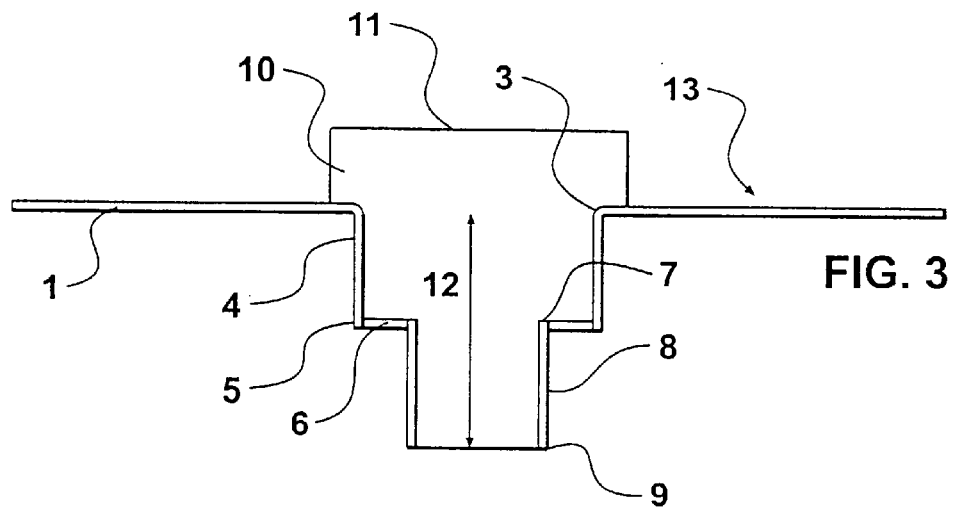
FIG. 3: illustrates a side elevation view through 3—3 of the insect trap fitting in FIG. 2.
Figure 4:
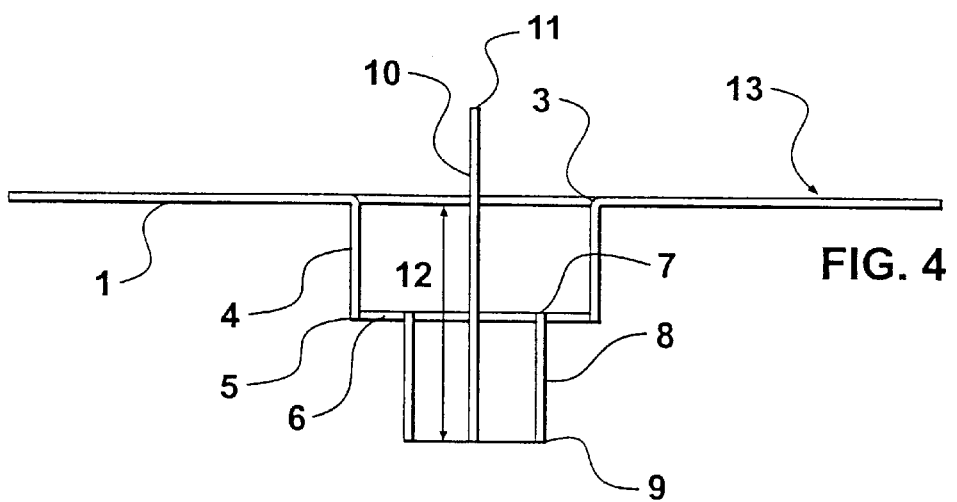
FIG. 4: illustrates a cross sectioned view through 4—4 of the insect trap fitting in FIG. 2.

The invention will now be described by way of example and with reference to a fly trap. However, the invention may also be used to trap other kinds of flying insects.

FIGS. 1 to 4 illustrate an insect trap fitting. In a preferred embodiment the insect trap fitting includes a circular cover plate 1 with a suitably sized first aperture 3 in its centre. The cover plate 1 may be approximately 225 mm in diameter and the aperture 3 may be approximately 70 mm in diameter. The periphery of the first aperture 3 extends in a downwardly direction, from cover plate 1, to form a first skirt 4. At the bottom edge 5 of the first downwardly extending skirt 4 is a screen 6. The screen 6 is suitably sized to allow air to freely pass first aperture 3, and first skirt 4, but prevent the passage of insects, in particular flies.

A second aperture 7, which is smaller in diameter than the first aperture 3, is provided in the screen 6. Aperture 7 may be approximately 32 mm in diameter and concentric with first aperture 3. The periphery of the second aperture 7 extends in a downwardly direction, from the screen 6, to form a second skirt 8. The lower edge 9 of the second skirt 8 is open and free of obstruction to allow the passage of insects and flies. Thus the first skirt 4 and second skirt 8 form a passage 12, reducing in size at aperture 7, through which flying insects can pass. This passage 12 extends from first aperture 3, through second aperture 7, to the opening at the lower edge 9 of second skirt 8.

The passage 12 is diametrically bisected by a vertically orientated blade 10 which extends in an upwards direction from bottom edge 9, of lower skirt 8, through aperture 7 and first aperture 3 so that its top edge 11 projects above the top surface 13 of cover plate 1. Top edge 11 of blade 10 may extend approximately 20 mm above the top surface 13 of cover plate 1. Movement of air across the top surface 13 of cover 1 creates a low pressure area as it passes blade 10. This causes air to be drawn through passage 12 and through screen 6, distributing scent of an attractant.

In the preferred embodiment at least cover plate 1 is made of a transparent material. In other embodiments the entire insect trap fitting is injection moulded in a transparent plastic material. The reason for using transparent material is this. When flies enter a trap they will be attracted to light in order to escape. If the fitting is made from opaque material then the only light passing through it will be through passage 12 and screen 6. Flies will be attracted to these areas. If they fly to screen 6 they will be prevented from escaping. However, they may be attracted to the open end 9 of passage 12 and thereby escape from the trap. If at least cover plate 1 is made of transparent material flies will be attracted to the underside of the cover plate generally and are therefore less likely to find an escape via passage 12. To find the opening 9 to passage 12 the fly has to move away from the light. If a fly is attracted to fresh air it may find its way to screen 6 but will still be prevented from exiting due to second skirt 8. The fly would again have to move away from the fresh air in order to find opening 9 at the end of passage 12.

Figure 5:
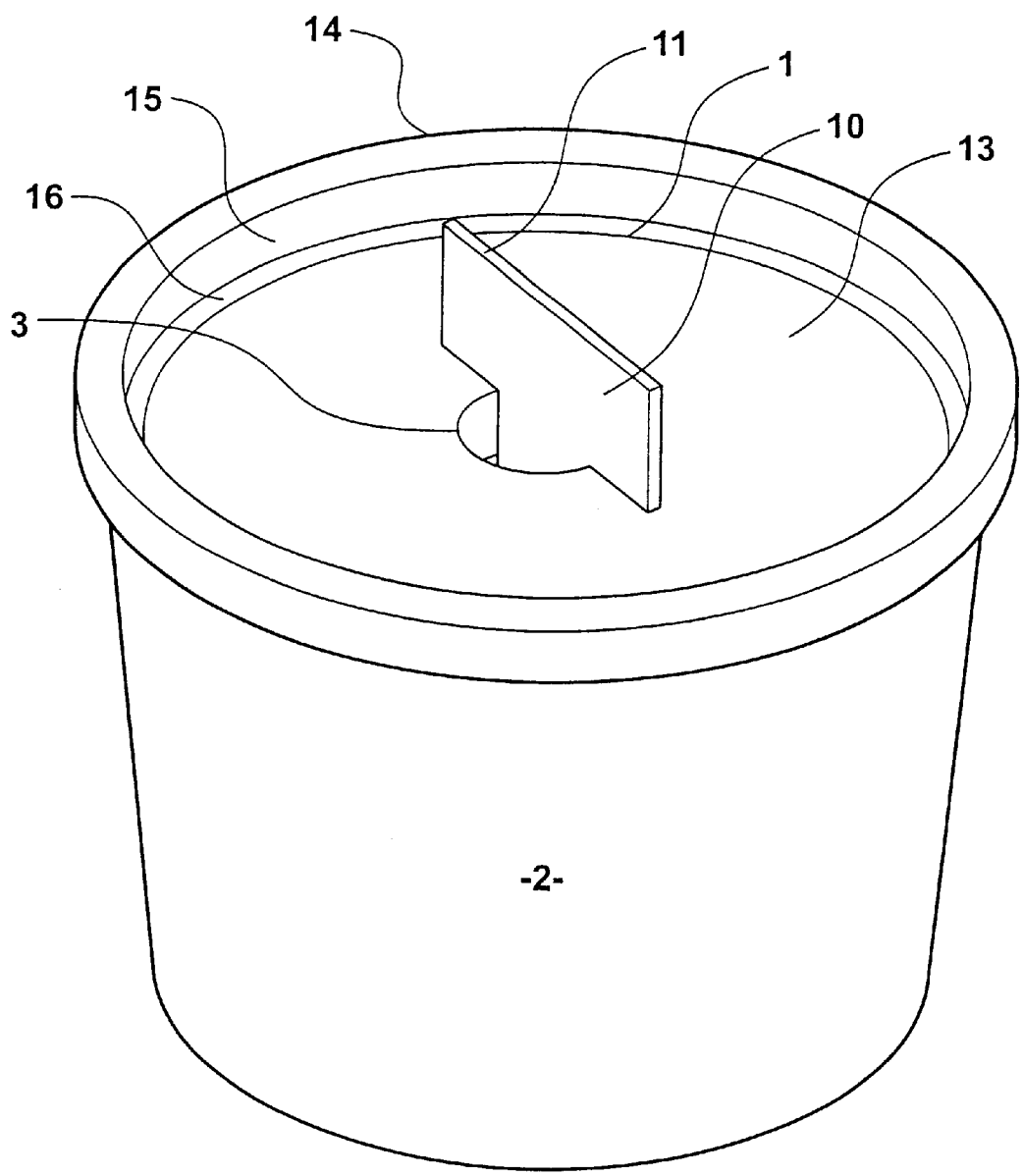
FIG. 5: illustrates a perspective view of an insect trap using a fitting according to the invention.

The fitting of the invention is adapted to be used with a number of commonly available receptacles 2, such as a bucket or the common ten-liter paint pail. In use, the cover plate 1 can be applied to a receptacle 2 (see FIG. 5) which contains a suitable insect bait or attractant. Movement of air across the top of cover 1 creates a low pressure area as it passes blade 10. This aids in dispersion of scent from the trap so that the trap is more effective in attracting flies. Flies enter the trap through the passage 12 from first aperture 3 to the bottom 9 of lower skirt 8.

Blade 10 aids in disbursing scant from the trap by a venturi type affect. Air movement across the top surface 13 of cover plate 1 has to pass top 11 of blade 10. A low pressure area is created on the downwind side of blade 10 which results in a venturi affect drawing scent from within the trap and disbursing it in moving air outside the trap.

Screen 6 allows the first aperture 3 to be of greater diameter so that a greater volume of scent from the bait or attractant escapes the trap. It also allows flies in the trap to investigate fresh air without the possibility of finding an exit via the opening at the lower edge 9 of skirt 8. The screen 6 also allows airflow through the trap which reduces internal trap temperature when the trap is placed in direct sunlight.

In order to avoid the possibility that flies within the trap will infest the bait or attractant it is generally submerged or mixed with liquid. During summer months the liquid level within prior art traps evaporates quickly and the traps require regular maintenance in order to replenish the liquid level and remove any build up of flies. In the preferred embodiment the fitting of the invention is fitted to a receptacle with a recessed lid 14 so that the upper rim of the receptacle 2, or receptacle lid 14, provides an abutment 15 to trap and retain rainwater on top of cover plate 1. The water can pass into the receptacle 2 either via aperture 3 or by capillary action through the gap between cover plate 1 and an edge 16 (described later) thereby replenishing the liquid level.

The insect trap fitting will now be described by way of reference to its method of use. In a particular embodiment the fitting is used with a ten-liter paint pail 2. The centre of the lid 14 is cut out leaving approximately a 15 mm edge 16 for the insect trap fitting to rest on. The pail 2 is filled to approximately ⅓ with water and bait or attractant. The lid 14 is placed on the pail 2 and the insect trap fitting positioned so as to cover the cut out section of the lid 14. The trap is positioned so that the top 11 of blade 10 is at 90 degrees to the predominant prevailing wind. This aids in disbursement of the attractant scent due to a low pressure area caused by the blade 10. Because the lid 14 has a recessed centre the trap will collect rainwater to top up evaporation. This means that the trap does not need regular servicing. It is possible that the trap may function for up to 3 months without servicing as trapped flies will themselves become bait.

The inventor believes that flies are attracted to a narrow scent band and that after one to two weeks the original attractant in the trap will decay to a stage where its scent is less effective to attracting flies. Flies that have been caught in the trap will themselves decay and provide fresh attractant. As these decaying flies become less effective recently trapped flies begin to decay. Thus the trap is self baiting and it should always have freshly decaying attractant.

Figure 6:
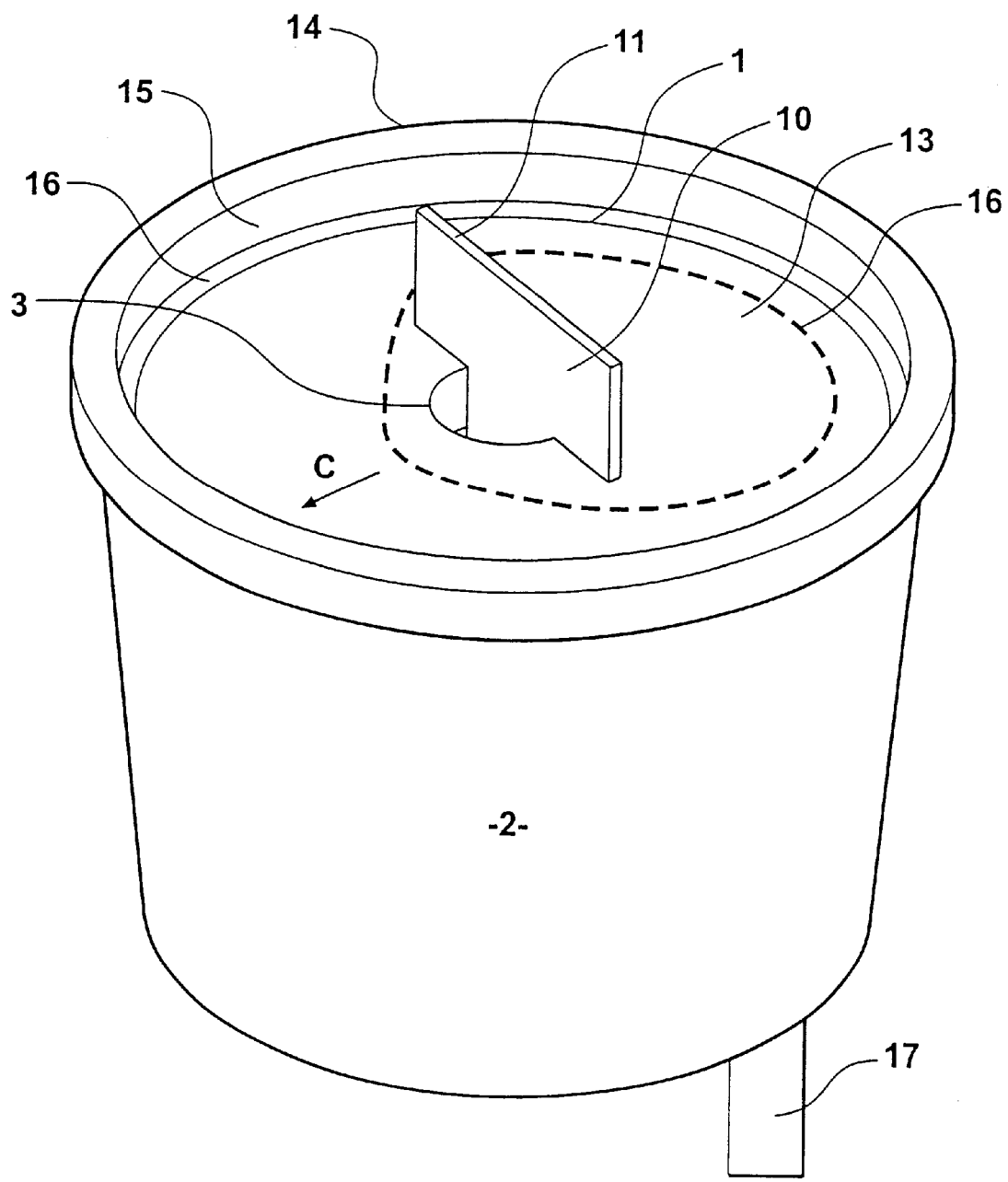
FIG. 6: illustrates how to prepare an insect trap for use in high rainfall areas.

In high rainfall areas sealant can be placed between cover plate 1 and edge 16, and the trap placed on a small angle to prevent rainwater from overfilling the receptacle 2. Referring to FIG. 6, a method of preparing the trap for high rainfall areas is shown. Instead of cutting out a round hole in lid 14, as previously described, the lid is only cut out on one side. The cut out portion is illustrated by line 16 on FIG. 6. A small stone or block 17 is placed under one side of the receptacle 2 so that it is on a slight angle with the area indicated by arrow C lowermost. A certain amount of rainwater will enter the trap through aperture 3 however a greater amount will overflow abutment 15 of lid 14 so the trap is not overfilled.

In an alternative embodiment the insect trap fitting is used with a plastic, or similar, bag as the receptacle. In this embodiment a small hole is made in the top of blade 10 so that the insect trap fitting can be suspended from, say, a tree or building saves. The opening or neck of a bag containing attractant is secured to the periphery of the cover plate. A method of securing a bag in this manner is well within the ability of a skilled person, Where in the aforegoing, description reference has been made to integers or elements having known equivalents, then such equivalents are herein included as if individually forth.

A particular example of the invention has been described and it is envisaged that improvements and modifications can take place without departing from the scope thereof.

What is claimed is:

1. An open top insect trap fitting for covering an opening in a receptacle containing insect attractant, the fitting including:

a transparent cover plate with a first aperture forming an open top in the fitting;

a first skirt extending downwardly from the periphery of the first aperture;

an insect screen at a lower edge of the first skirt, the screen having a second aperture;

a second skirt extending downwardly from the periphery of the second aperture; and a blade extending across the second aperture and the second skirt and extending upward to a position above the first aperture in the cover plate so that, in use, insects are trapped beneath the transparent cover plate after having entered through the first aperture and the second aperture while being attracted to fresh air at the insect screen;

the cover plate collecting and passing rainwater into the receptacle through the first aperture thereby replenishing liquid covering the attractant.

2. An open top insect trap fitting as claimed in claim 1, wherein the blade is adapted so that air movement across the top surface of the cover plate results in a low pressure area and movement of air through the apertures.

3. An open top insect trap fitting as claimed in claim 1, wherein the insect trap fitting is made from a plastic material.

4. An open top insect trap including:
an attractant receptacle with an opening;
a fitting disposed to cover the opening, the fitting including:
a transparent cover plate with a first aperture forming an open top to the fitting;
a first skirt extending downwardly from the periphery of the first aperture;
an insect screen at the lower edge of the first skirt, the screen having a second aperture;
a second skirt extending downwardly from the periphery of the second aperture; and
a blade extending from the second aperture to a position above the first aperture in the cover plate so that, in use, insects are trapped in the receptacle beneath the transparent cover plate after having entered through the first aperture and the second aperture while being attracted to fresh air at the insect screen;
the cover plate covering the receptacle and passing rainwater into the receptacle through the first aperture thereby replenishing liquid covering an attractant.

5. An open top insect trap as claimed in claim 4, wherein the cover plate is a closure for the receptacle.

6. An open top insect trap as claimed in claim 4, wherein the blade is shaped so that air movement across the top surface of the cover plate results in a low pressure area and movement of air through the first aperture.

7. An open top insect trap as claimed in claim 4, wherein the screen is sized to allow air to pass through the screen, but not insects.

8. An open top insect trap as claimed in claim 4, wherein the insect trap fitting is made from a plastics material.

9. An open top insect trap as claimed claim 4, wherein one of the receptacle and fitting has a recessed edge so that rainwater collects on top of the cover plate and passes into the receptacle through the first aperture.

10. An open top insect trap as claimed in claim 4, wherein the receptacle is a bag, one of an open end and neck of the bag being secured to the periphery of the cover plate.

\* \* \* \* \*